(12) United States Patent
Motohashi

(10) Patent No.: US 7,649,878 B2
(45) Date of Patent: Jan. 19, 2010

(54) CIRCUIT CONTROL APPARATUS AND METHOD

(75) Inventor: Hiroomi Motohashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1146 days.

(21) Appl. No.: 10/999,982

(22) Filed: Dec. 1, 2004

(65) Prior Publication Data

US 2005/0157702 A1    Jul. 21, 2005

(30) Foreign Application Priority Data

Dec. 5, 2003    (JP) .............................. 2003-408245

(51) Int. Cl.
*H04L 12/50*    (2006.01)
(52) U.S. Cl. .................. 370/385; 370/351; 370/352; 370/381; 379/219
(58) Field of Classification Search ................ 370/385, 370/493, 352
See application file for complete search history.

(56) References Cited

U.S. PATENT DOCUMENTS 6,226,289 B1 *   5/2001   Williams et al. ............ 370/385
2004/0208167 A1   10/2004   Kishida

FOREIGN PATENT DOCUMENTS

| JP | 11-275256 | 10/1999 |
|---|---|---|
| JP | 2001-217929 | 8/2001 |
| JP | 2003-92678 | 3/2003 |
| JP | 2003-224680 | 8/2003 |
| JP | 2003-224682 | 8/2003 |
| JP | 2003-258998 | 9/2003 |
| WO | WO 02/100083 A1 | 12/2002 |

* cited by examiner

*Primary Examiner*—Fan Tsang
*Assistant Examiner*—Simon King
(74) *Attorney, Agent, or Firm*—Oblon, Spivak, McClelland, Maier & Neustadt, L.L.P.

(57) ABSTRACT

A circuit control apparatus for establishing a connection to a communication partner via a public circuit network or via a computer network is disclosed. The circuit control apparatus includes: a specifying information storing part 171 for storing specifying information for specifying a called party to which the circuit control apparatus originates a call to establish a connection via the public circuit network; a circuit control part 11 for immediately originating a call via the public circuit network for establishing a connection to a called party specified by the specifying information, and for trying to originate a call via the computer network for establishing a connection to a called party that is not included in the specifying information storing part; and a changing part 16 for changing specifying information in the specifying information storing part.

28 Claims, 16 Drawing Sheets

FIG.6

| No | TELEPHONE NUMBER | REGISTRATION DATE AND TIME | |
|---|---|---|---|
| 1 | 110 | — | UNREWRITABLE REGION |
| 2 | 119 | — | |
| 3 | 114 | — | |
| ⋮ | ⋮ | ⋮ | |
| 10 | xyz | — | |
| 11 | 03-xxxx-yyyy | 2003/07/12, 12:35 | REWRITABLE REGION |
| 12 | 03-xxyy-zzyy | 2003/07/19, 22:06 | |
| 13 | 03-yyzz-zzzz | 2003/07/30, 18:53 | |
| ⋮ | ⋮ | ⋮ | |

171

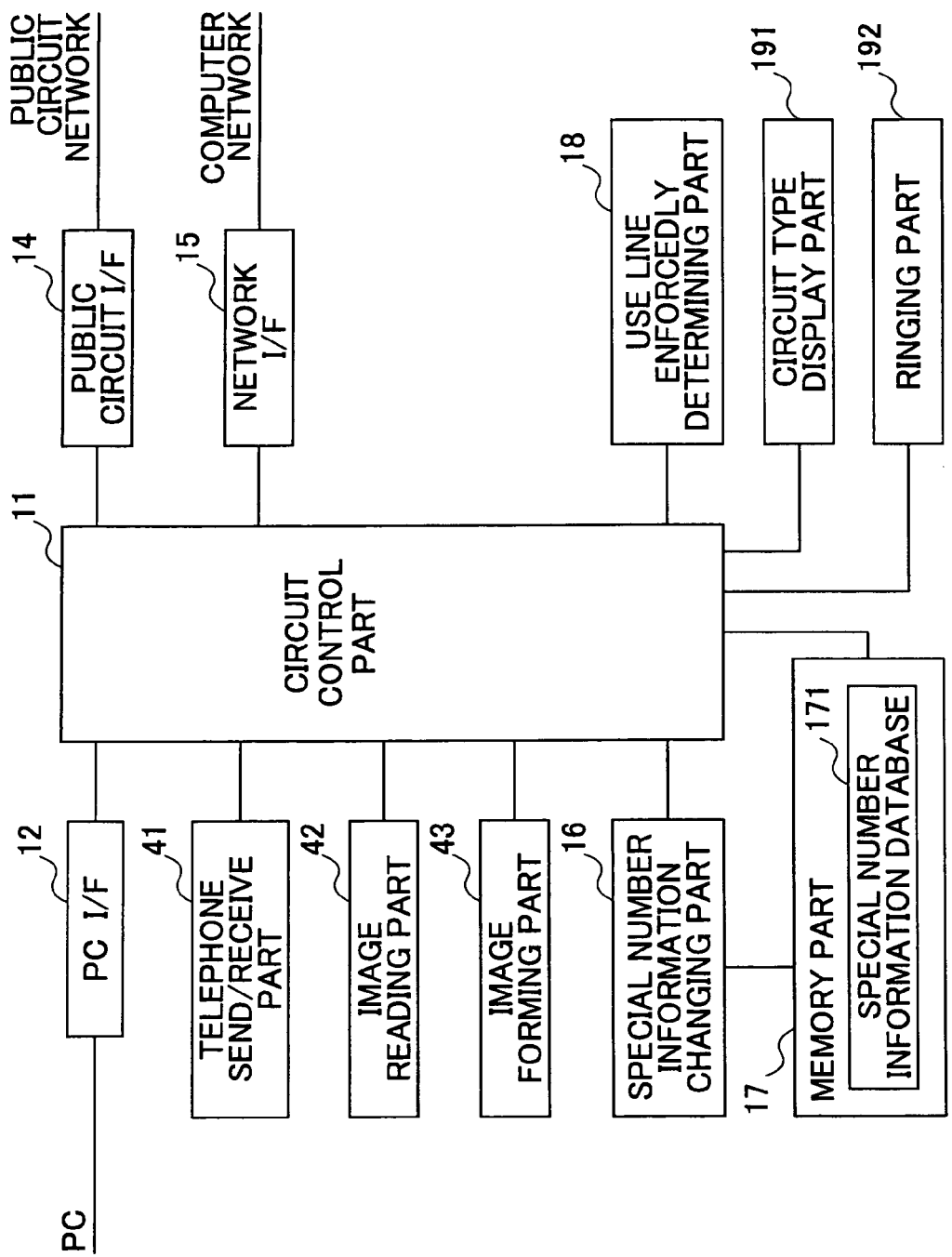

CIRCUIT CONTROL APPARATUS AND METHOD

BACKGROUND OF THE INVENTION

1. Field of the Invention

The present invention relates to a circuit control apparatus and a method for controlling flows of calling signals/communication data transmitted to a public circuit network or a computer network on the basis of a telephone number.

2. Description of the Related Art

Circuit control apparatuses have previously existed for performing communications by using VoIP (Voice over Internet Protocol) via the computer network in addition to performing communications with a telephone or a facsimile via the public circuit network.

In a circuit control apparatus, a telephone number of a called party that cannot be reached via the computer network is stored as a special number beforehand when the circuit control apparatus was manufactured, so that the circuit control apparatus originates a call to the called party of the special number via the public circuit network without trying to originate a call via the computer network. A telephone number (110) of the police and a telephone number (119) of emergency are examples of the special number.

Japanese laid-open patent application No.2003-224682 discloses an adapter used for establishing a dial-up connection to a server for internet telephone. The adapter stores information necessary for dial-up and user authentication, so that operation activities by the user for performing dial-up connection can be decreased.

In a case when a user originates a call to a special number registered beforehand in an apparatus or an IP telephone adapter, there is not any problem such as increase of a connection establishing time since call origination via the public circuit network is performed at the beginning. However, according to the above-mentioned conventional circuit control apparatus, for originating a call to a called party having a telephone number other than the special number, the circuit control apparatus first tries to establish a connection to the called party via the computer network. After that, when it is determined that the called party cannot be reached via the computer network, the circuit control apparatus establishes a connection to the called party via the public circuit network. Thus, for communicating with a called party that can be connected only via the public circuit network, the time for trying to establish a connection to the called party via the computer network is wasted, so that there is a problem in that a connection time from starting a call origination process to establishing a connection becomes long.

In addition, the technology in the Japanese laid-open patent application No.2003-224682 is for decreasing operation activities for performing dial-up connection by automatically sending information to a server. In the technology, it is not considered to decrease the connection time.

SUMMARY OF THE INVENTION

An object of the present invention is to provide a circuit control apparatus and a method for decreasing a connection establishing time in a system that enables a telephone to connect to a called party via a computer network or via a public circuit network.

The object is achieved by a circuit control apparatus for establishing a connection to a communication partner via a public circuit network or via a computer network, the circuit control apparatus including:

a specifying information storing part for storing specifying information for specifying a called party to which the circuit control apparatus originates a call to establish a connection via the public circuit network;

a circuit control part for immediately originating a call via the public circuit network for establishing a connection to a called party specified by the specifying information, and for trying to originate a call via the computer network for establishing a connection to a called party that is not included in the specifying information storing part; and a changing part for changing specifying information in the specifying information storing part.

The object is also achieved by a circuit control method for use in a circuit control apparatus for establishing a connection to a communication partner via a public circuit network or via a computer network, wherein the circuit control apparatus includes a specifying information storing part for storing specifying information for specifying a called party to which the circuit control apparatus originates a call to establish a connection via the public circuit network, the circuit control method including:

a circuit control step of immediately originating a call via the public circuit network for establishing a connection to a called party specified by the specifying information, and for trying to originate a call via the computer network for establishing a connection to a called party that is not included in the specifying information storing part; and a changing step of changing specifying information in the specifying information storing part.

According to the present invention, since the specifying information can be changed in the circuit control apparatus, the connection time can be decreased when the circuit control apparatus establishes a connection to a called party that does not support communications via a computer network.

BRIEF DESCRIPTION OF THE DRAWINGS

Other objects, features and advantages of the present invention will become more apparent from the following detailed description when read in conjunction with the accompanying drawings, in which:

FIG. 6 shows a configuration example of a special number information database 171;

FIG. 16 is a schematic diagram of a MF machine according to a third embodiment of the present invention.

DETAILED DESCRIPTION OF THE PREFERRED EMBODIMENTS

In the following, embodiments of the circuit control apparatus and the method of the present invention are described with reference to figures.

First Embodiment

Figure 1:
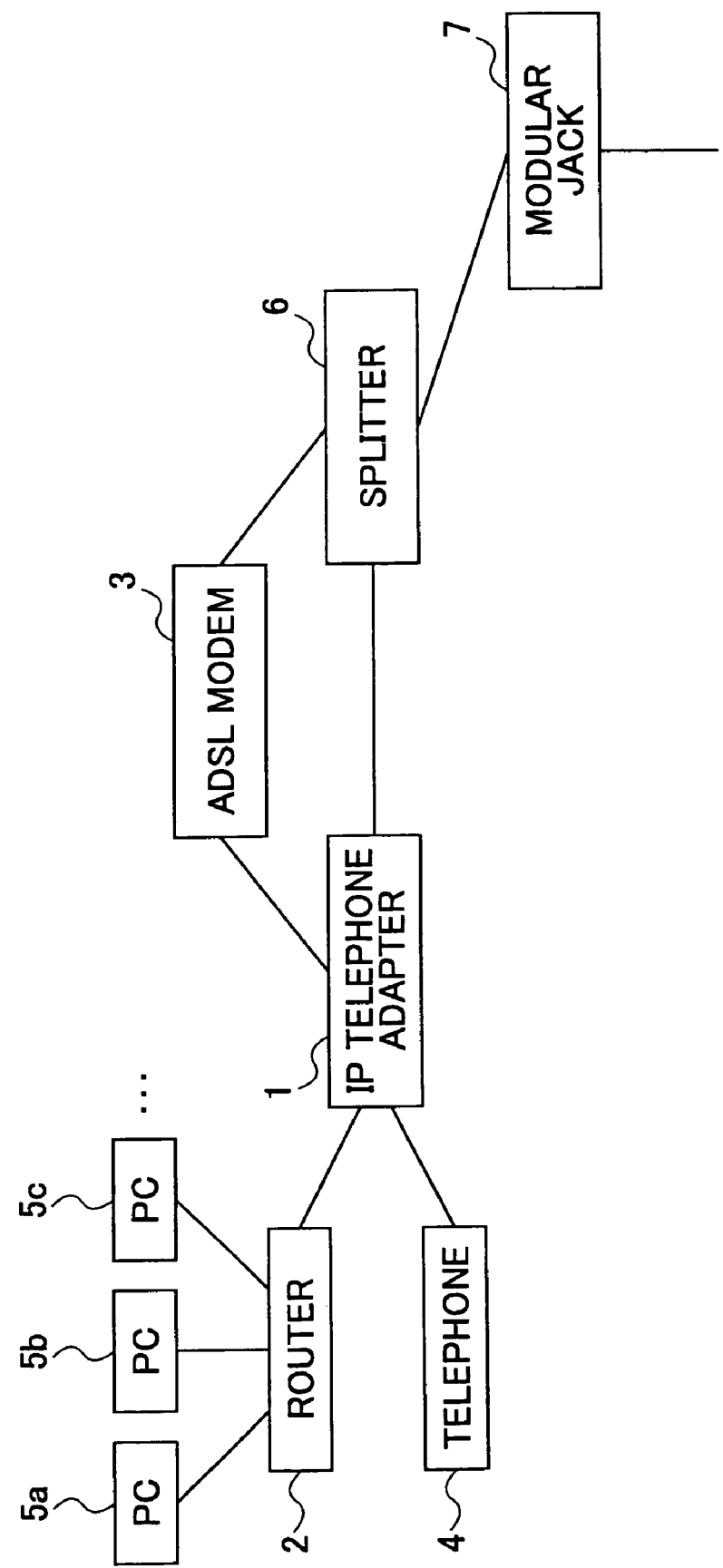
FIG. 1 shows an example of a house-wiring around an IP telephone adapter according to a first embodiment of the present invention.

A first embodiment of the present invention is described. In the first embodiment, the circuit control apparatus of the present invention is applied to an IP telephone adapter. FIG. 1 shows an example of a house-wiring around the IP telephone adapter.

The IP telephone adapter 1 of the present embodiment is connected to PCs 5 via a router 2. In addition, the IP telephone adapter 1 is connected to an ADSL modem 3, a splitter 6 and a telephone 4. The splitter 6 is connected to a modular jack 7, so that each of the telephone 4 and the PC 5 can be connected to a circuit to a called party via the IP telephone adapter 1 and via the modular jack 7.

The splitter 7 separates a signal from the circuit into a signal for the ADSL modem 3 and a telephone signal. The separated lines are merged at the IP telephone adapter 1. By using such wiring, the telephone adapter 1 can switch between a data communication and a telephone communication. In the data communication, data from the PC 5 are transmitted via the ADSL modem 3. In the telephone communication, a voice signal from the telephone 4 is transmitted without passing through the ADSL modem 3.

Figure 2:
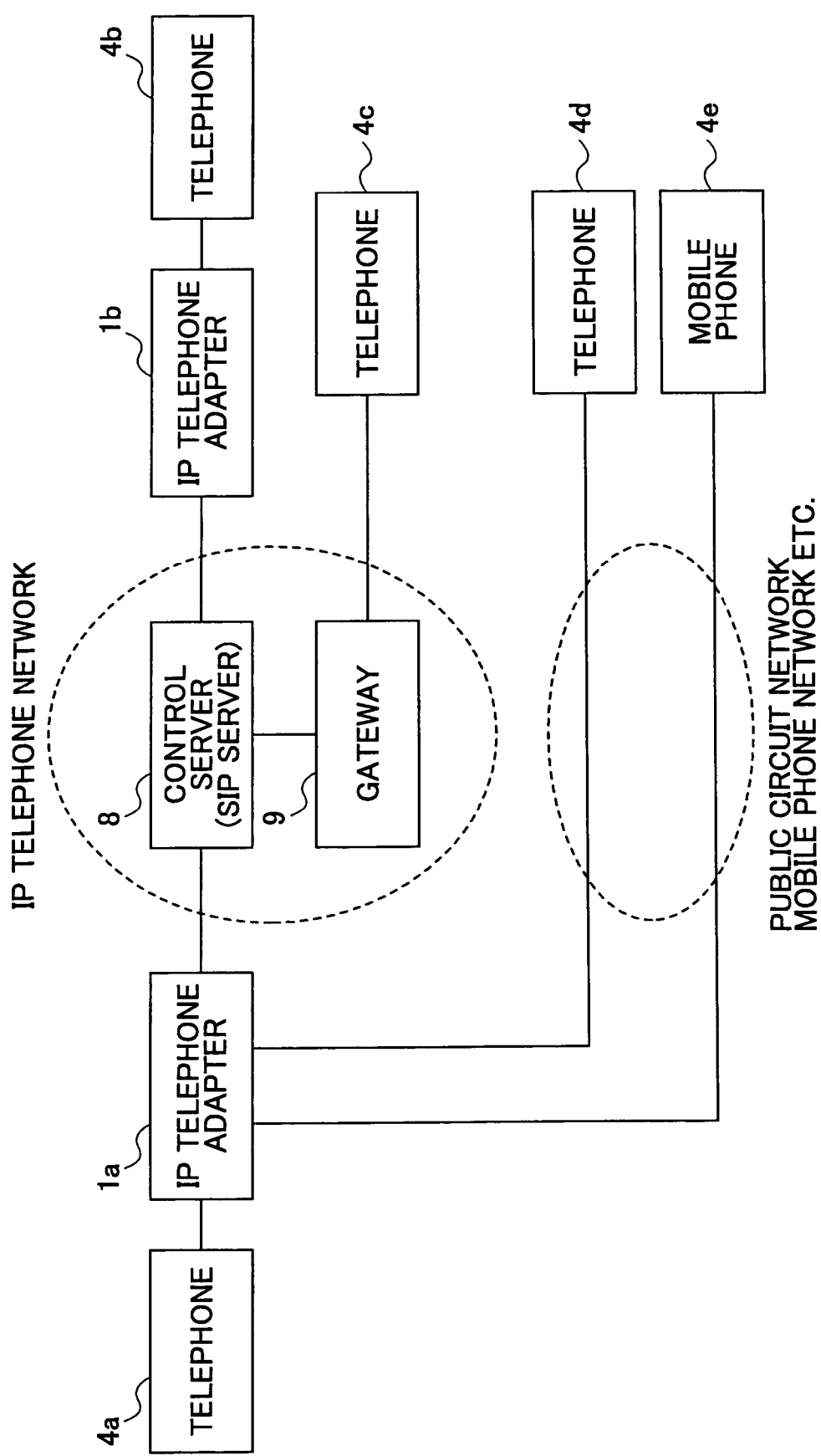
FIG. 2 is a block diagram for explaining a connection establishing procedure by using IP telephone adapters 1a and 1b.

The IP telephone adapter 1 accesses a control server (a SIP server, for example) via a circuit extending from the modular jack 7. After performing a signaling procedure for establishing a connection of VoIP, the IP telephone adapter 1 can connect to an IP telephone adapter in a called party. FIG. 2 is a block diagram for explaining a connection establishing procedure by using IP telephone adapters 1a and 1b. In the figure, a telephone 4b can be reached only via an IP telephone network. A telephone 4c can be reached via the IP telephone network and a public circuit network by using a gateway 9. A telephone 4d cannot be reached via the IP telephone network. The "IP telephone network" is a telephone communication network based on a computer network including the control server and the gateway. In the example of FIG. 2, a SIP (session initiation protocol) server is used as a control server for performing the signaling procedure for establishing an VoIP connection. After the connection is established, communication data are exchanged between a calling party and a called party without the control server 8.

As shown in FIG. 2, when the IP telephone adapter 1a establishes a connection to the telephone 4b, the IP telephone adapter 1a obtains an IP address of the IP telephone adapter 1b from the control server 8. When the IP telephone adapter 1a establishes a connection to the telephone 4c, the IP telephone adapter 1a accesses the control server 8 so as to connect to the telephone 4c via the gateway 9 and via a public circuit network that connects the gateway 9 and the telephone 4c. When the telephone 4b is a subscriber of an IP telephone service provider different from an IP telephone service provider for the telephone 4a, a call connection between the telephones 4a and 4b may be established by using a plurality of control servers.

When the telephone 4a originates a call to the telephone 4d, the IP telephone adapter 1a establishes a connection to the telephone 4d via the public circuit network. In addition, when the telephone 4a originates a call to a mobile telephone 4e, the IP telephone adapter 1a establish a connection to the mobile telephone 4e via the public circuit network and a mobile telephone network.

The "public circuit network" in this specification is a telephone communication network such as the PSTN (Public Switched Telephone Network) and the ISDN (Integrated Services Digital Network). The "computer network" is an IP (Internet Protocol) network such as the Internet, LAN and WAN.

Next, a procedure for establishing a call connection via the IP telephone network is described with reference to FIG. 3. When a user dials a telephone number of a called party from the telephone 4a, the dialed number is transmitted to the IP telephone adapter 1a as dial tones or dial pulses in step S101. The IP telephone adapter 1a that receives the number sends a call request (INVITE message) for the called party to the control server 8 in step S102.

The control server 8 transfers the INVITE message to the telephone adapter 1b corresponding to the called party. In addition, the control server 8 sends a 100 Trying message that indicates that the control server 8 is calling the called party to the IP telephone adapter 1a in step S103.

When the IP telephone adapter 1b receives the call request (INVITE message), the IP telephone adapter 1b rings a telephone bell of the telephone 4b, and sends a 180 Ringing message to the control server 8 to notify that the IP telephone adapter 1b is calling the telephone 4b in step S104. When the 180 Ringing message is sent to the IP telephone adapter 1a in step S105, the IP telephone adapter 1a sends a ringback tone to the telephone 4a in step S106.

Accordingly, while the telephone 4b that is a called party is ringing, the telephone 4a continues to output the ringback tone.

When a handset of the telephone 4b is lifted in step S107, the IP telephone adapter 1b sends a 200 OK message that indicates that calling is successfully done to the control sever 8 in step S108. The message is sent from the control sever 8 to the IP telephone adapter 1a in step S109. When the IP telephone adapter 1a receives the message, the IP telephone adapter 1a stops sending the ringback tone and sends an ACK message to the control server 8 in step 110. Then, the control server 8 transfers the ACK message to the IP telephone adapter 1b in step S111.

As a result, each of the IP telephone adapter 1a and 1b enters a call starting state, so that a call communication between the telephones 4a and 4b starts.

Figure 4:
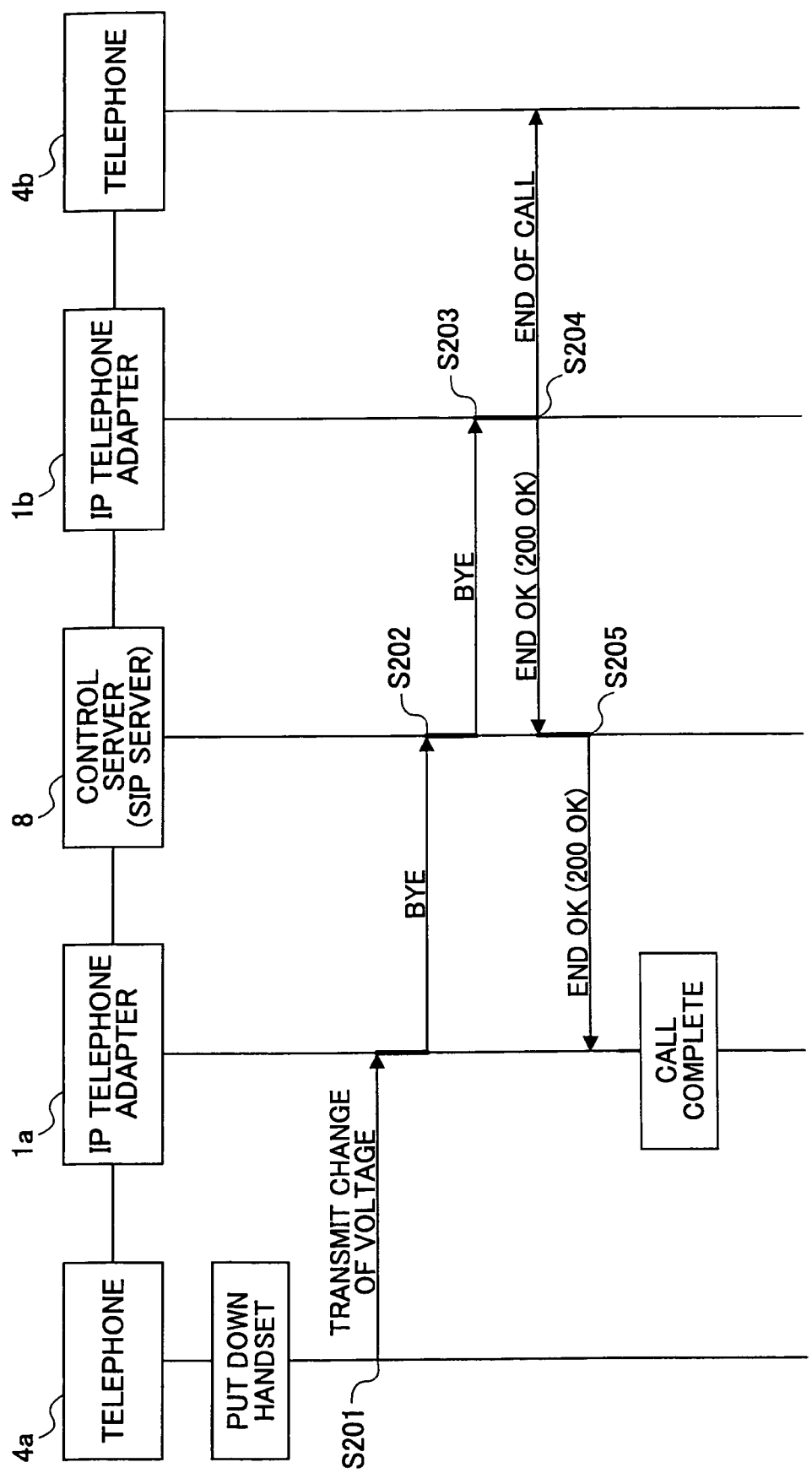
FIG. 4 is a sequence chart showing a procedure for ending the call communication via the IP telephone network.

Next, a procedure for ending the call communication via the IP telephone network is described with reference to FIG. 4.

When the user puts down the handset of the telephone 4a, the change of the voltage is sent to the IP telephone adapter 1a, so that the IP telephone adapter 1a recognizes that the call of the user ends in step S201. The IP telephone adapter 1a sends a BYE message indicating that the call ends to the control server 8 in step S202. Then, the message is sent to the IP telephone adapter 1b from the control server 8 in step S203.

The IP telephone adapter 1*b* that is notified of the end of the call makes the telephone 4*b* to a call end state, and sends a 200 OK message to the IP telephone adapter 1*a* in steps S204 and S205.

As a result, each of the IP telephone adapters 1*a* and 1*b* enters a call end state, so that the cal communication ends between the telephones 4*a* and 4*b*.

Figure 5:
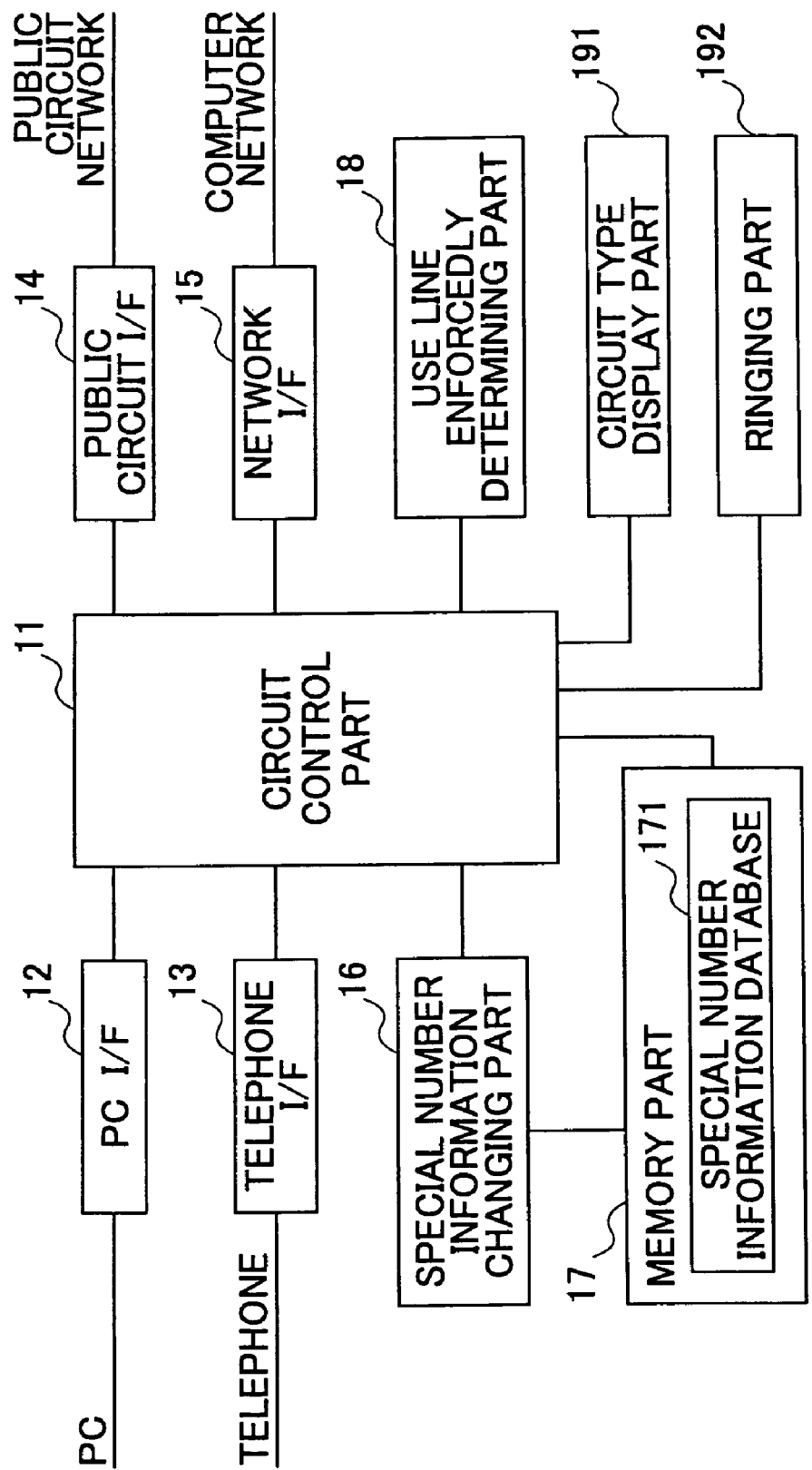
FIG. 5 is a block diagram showing a configuration of an IP telephone adapter according to the first embodiment of the present invention.

Next, a configuration of the IP telephone adapter 1 of this embodiment is described with reference to FIG. 5.

The IP telephone adapter 1 includes a PC I/F 12 for connecting to the PCs 5, a telephone I/F 13 for connecting to the telephone 4, a public circuit I/F 14 for connecting to a public circuit network, and a network I/F 15 for connecting to a computer network, which are connected to a circuit control part 11. In addition, the IP telephone adapter 1 includes a special number information changing part 16, a memory part 17, a use circuit determining part 18, a circuit type display part 191 and a ringing part 192.

The circuit control part 11 controls the whole of the IP telephone adapter 1, for example, the circuit control part 11 performs a circuit connection process. The memory part 17 stores a special number information database 171. The special number information changing part 16 is connected to the memory part 17 and changes information stored in the special number information database 171.

The special number information database 171 stores information for specifying called parties to which a call is originated via the public circuit network without trying to originating a call via the computer network when the circuit control part 11 receives a call origination request from the telephone 4. The information stored in the special number information database 171 includes a telephone number or a part of a telephone number as shown in FIG. 6.

As shown in FIG. 6, the special number information database 171 is divided into a unrewritable region and a rewritable region. Each piece of data in the rewritable region is associated with a registration date-and-time indicating a date-and-time when the piece of data is registered in the database.

The use circuit determining part 18 forcefully determines a circuit to cause the circuit control part 11 to try to originates a call to a called party via the computer network regardless whether the called party is registered in the special number information database 171.

The circuit type display part 191 displays information indicating whether a circuit used for currently originating a call is one via the computer network or one via the public circuit network when the circuit control part is performing a call origination process. The display part 191 may be a liquid crystal display or a LED.

The ringing part 192 is for outputting a circuit type specific ringback tone that is assigned to a circuit type which is one via the computer network or one via a public circuit network when the circuit control part 11 originates a call. The ringing part 192 may be a buzzer or a part for sending a signal of the tone.

Figure 7:
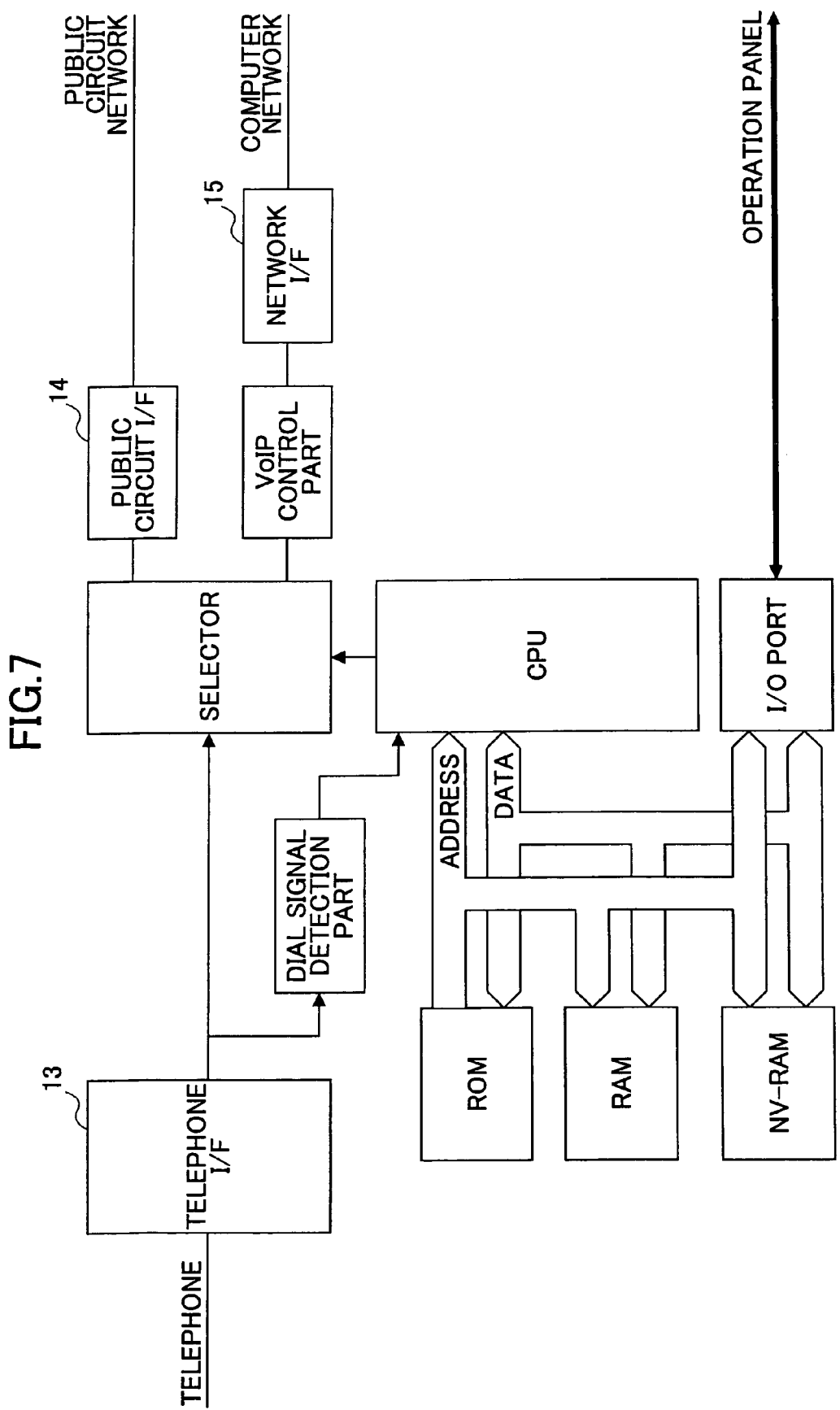
FIG. 7 shows a physical configuration of a main part of the IP telephone adapter.

FIG. 7 shows a physical configuration of a main part of the IP telephone adapter 1 including the circuit control part 11.

As shown in FIG. 7, the circuit control part 11, the special number information changing part 16, the memory part 17 and the use circuit determining part 18 may be realized by a CPU, a dial signal detection part, a selector, a ROM, a RAM, a NV (Non-Volatile)-RAM.

The special number information is stored in the ROM beforehand. Added special number information is stored in the NV-RAM such that the information is not disappeared even if the power is turned off. When a user lifts off the handset of the telephone 4 and dials a telephone number of a called party, the telephone number is detected by the dial signal detection part and sent to the CPU.

The CPU determines whether the dialed telephone number is included in the special number information database. If the dialed telephone number is a special number, the CPU instructs the selector to originates a call via the public circuit network. If the dialed telephone number is not a special number, the CPU instructs the selector to try to originate a call via the computer network. In this case, if the CPU determines that a connection via the computer network cannot be established, the CPU instructs the selector to originates a call via the public circuit network.

Figure 8:
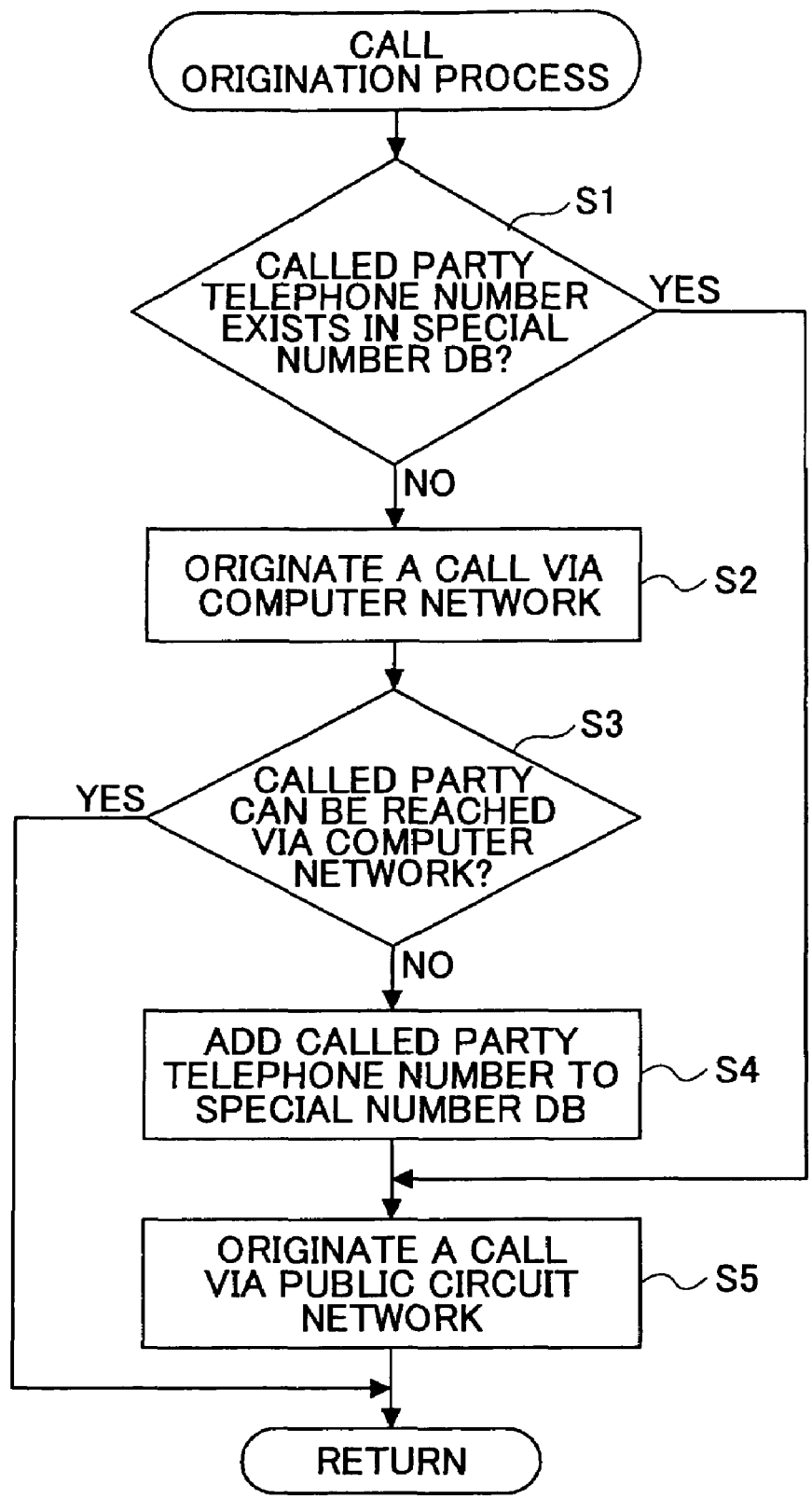
FIG. 8 is a flowchart showing first and second operation examples according to the first embodiment.

A first operation example of the present embodiment is described with reference to FIG. 8.

In this first operation example, if the telephone number of a called party does not exist in the special number information database in step S1, the circuit control part 11 tries to originate a call to the telephone number via the computer network in step S2. The IP telephone adapter determines whether a connection to the called party can be established via the computer network in step S3. If the IP telephone adapter determines that a connection to the called party cannot be established via the computer network, the circuit control part 11 automatically adds the telephone number in the rewritable region of the special number information database in step S4, and performs a process for originating a call to the telephone number via the public circuit network in step S5.

According to the first operation example, when originating a call to the same telephone number, call origination via the computer network can be omitted so that the call origination via the public circuit network starts at the beginning. Thus, since the time from dialing the telephone number of the called party to connection establishment completion can be decreased, operability of the VoIP apparatus improves. The effect of decreasing the connection time is obtained in a case where a call is originated to a telephone that can be connected only via the public telephone network like the telephone 4*d* shown in FIG. 2.

Generally, when originating a call to a special number registered beforehand in the IP telephone adapter or other apparatuses, since the call origination is performed via the public circuit network at the beginning, there is no problem such as long connection time. However, according to a conventional IP telephone adapter, when originating a call to a telephone number other than the special number, the IP telephone adapter tries to establish a connection via the computer network first, then, the IP telephone adapter establishes a connection via the public telephone network. Therefore, if the called party is reached only via the public circuit telephone network, the operation to try to establish a connection via the computer network is useless, and the time from starting a call origination process to completion of establishing a connection becomes long.

Against this problem, according to the above-mentioned first operation example, since the IP telephone adapter has a learning function to automatically add, to the special number information database, a telephone number turned out to be unconnectable via the computer network, the call origination process via the computer network can be omitted from a next call onward.

Next, a second operation example of the present embodiment is described with reference to FIG. 8. In the second operation example, a registration date-and-time of a special number is stored in the rewritable region of the special number information database 171 as attribute information of the telephone number as shown in FIG. 6. In this case, when the IP telephone adapter detects that a predetermined time (predetermined effective term) elapses after a special number is added, the special number is deleted. The predetermine time may be one month, for example.

As another operation example, a number of times of originating a call to the special number may be stored as attribute information of the number. In this case, when the IP telephone adapter detects that the number reaches a predetermined number, the IP telephone adapter deletes the special number.

In a case where the second operation example is not used, once a telephone number of a called party is registered in the special number information database, the connection process via the computer network is always skipped. Therefore, even if the called party that did not support IP telephone so far is changed to be able to use IP telephone at some point in time, the advantage of the IP telephone cannot be obtained for the called party since the call connection process is always performed via the public circuit network.

In contrast, according to the second operation example, the telephone number registered in the special number information database has an effective term. Thus, in a case where a called party that did not support VoIP so far changes to support VoIP at some point in time, after the effective term expires for the registered special number, a call origination to the called party can be performed via the computer network so that the called party can be connected via VoIP. As mentioned above, according to the second embodiment, freshness of telephone number information in the special number information database can be maintained.

Figure 9:
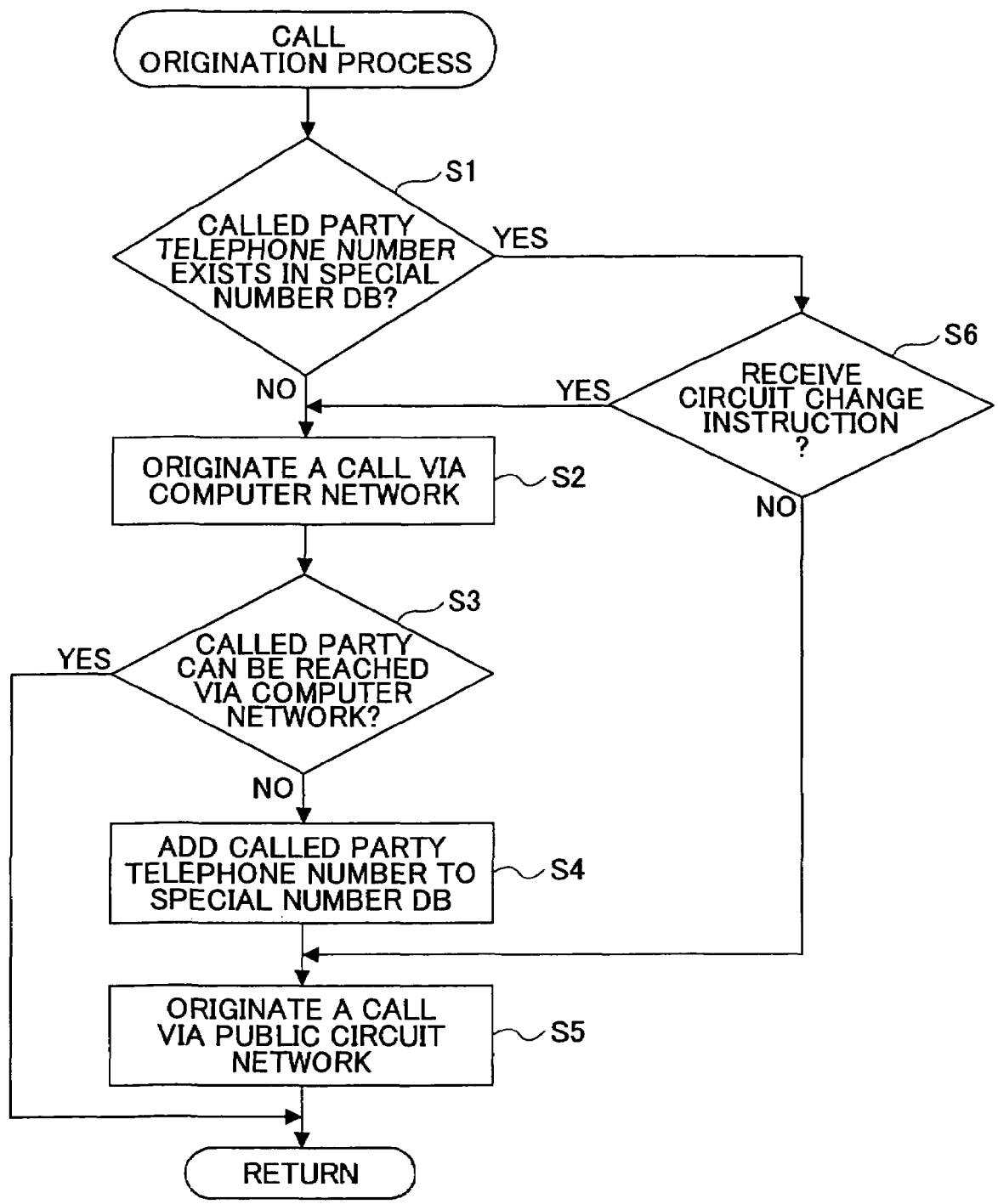
FIG. 9 is a flowchart showing a third operation example according to the first embodiment.

Next, a third operation example of this embodiment is described with reference to FIG. 9. In FIG. 9, same reference numerals have been used to identify corresponding steps in FIG. 8.

In the third embodiment, when the circuit control part 11 originates a call to a called party, if the use circuit enforcedly determining part 18 receives a use circuit change instruction, the use circuit enforcedly determining part 18 enforcedly determines a circuit used by the circuit control part 11 such that the circuit control part 11 tries to establish a connection to the called party via the computer network regardless whether the called party is registered in the special number information database 171 (step S6).

Means for inputting the use circuit change instruction to the use circuit enforcedly determining part 18 may be a special button on an operation panel. Alternatively, the use circuit change instruction may be input via the telephone I/F 13 by dialing a predetermined number ("#31", for example) before dialing the telephone number of the called party.

According to the third operation example, the use circuit enforcedly determining part 18 enforcedly provides a use circuit change instruction. Thus, in a case where a called party that did not support VoIP so far is changed to support VoIP at some point, if a user instructs to change a use circuit, call origination via the computer network can be performed, so that the advantage of the IP telephone can be easily obtained.

Figure 10:
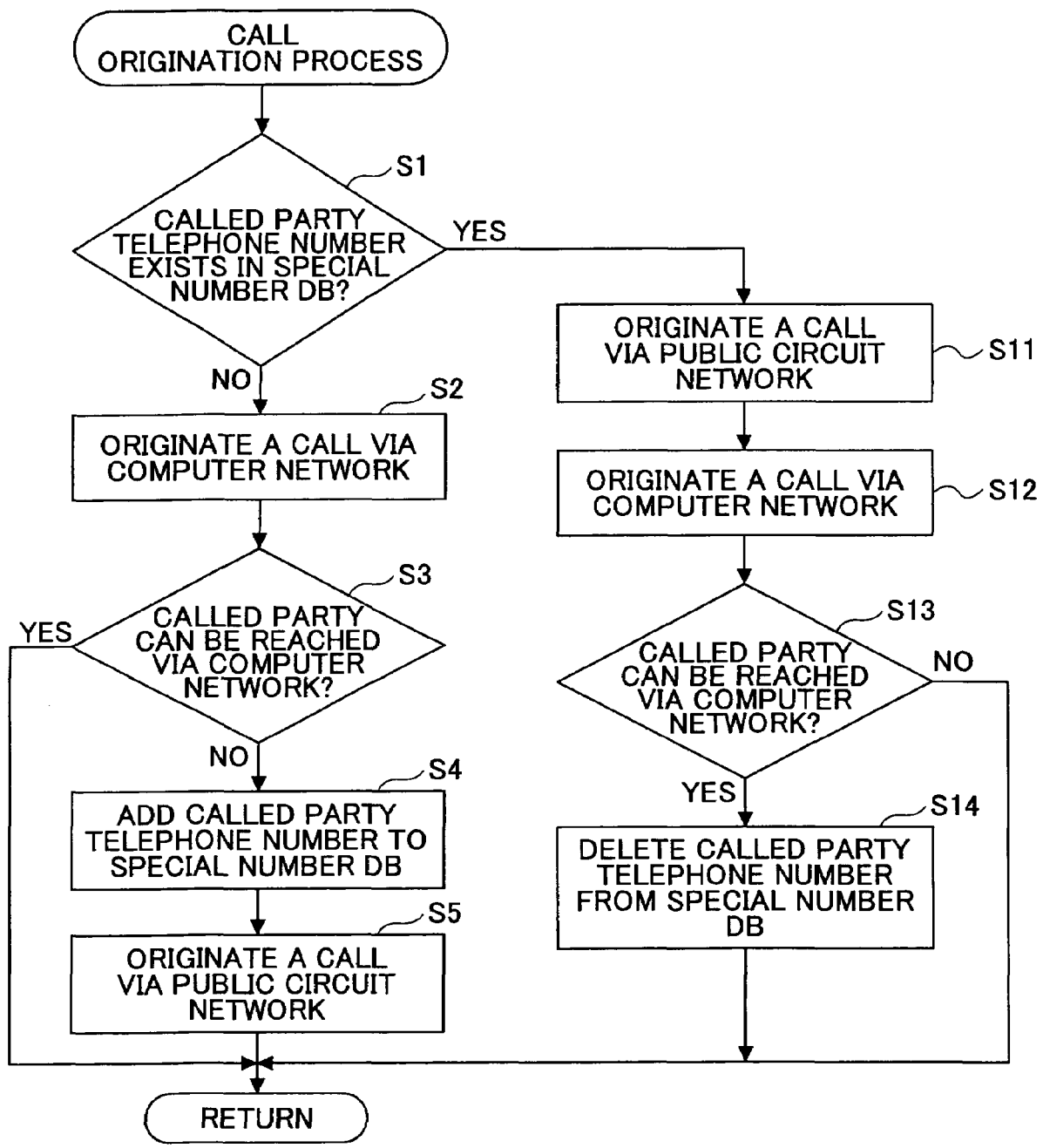
FIG. 10 is a flowchart showing a fourth operation example according to the first embodiment.

Next, a fourth operation example of this embodiment is described with reference to FIG. 10. In FIG. 10, same reference numerals have been used to identify corresponding steps in FIG. 8.

In the fourth operation example, after a call origination process is started via the public circuit network, a call origination process via the computer network is also performed. Then, based on the result of the call origination processes, the IP telephone adapter determines whether the called party can be reached via the computer network. The call origination process via the public circuit network (step S11) and the call origination process via the computer network (step S12) may be performed at the same time.

More particularly, when the control server 8 returns a response message "486 Busy Here" in response to the call request (INVITE), the circuit control part 11 determines that the called party can use VoIP. When the control server 8 returns a response message "380 Alternative Service" in response to the call request (INVITE), the circuit control part 11 determines that the called party cannot use VoIP.

In a case where the fourth operation example is not used, it is not possible to update the special number information database to reflect a fact that a called party supports VoIP without additional operations by the user and without increase of a connection time.

In contrast, by using the fourth operation example, when the IP telephone adapter originates a call to a number registered in the special number information database via the public circuit network, a call origination process via the computer network is also performed in the background. Then, if the circuit control part 11 determines that a connection via the computer network can be established, the special number information changing part 16 deletes the telephone number of the called party from the special number information database 171. Therefore, a fact that a called party supports IP telephone can be reflected to the special number information database without incurring additional operations for the user and without increase of the connection time.

Figure 11:
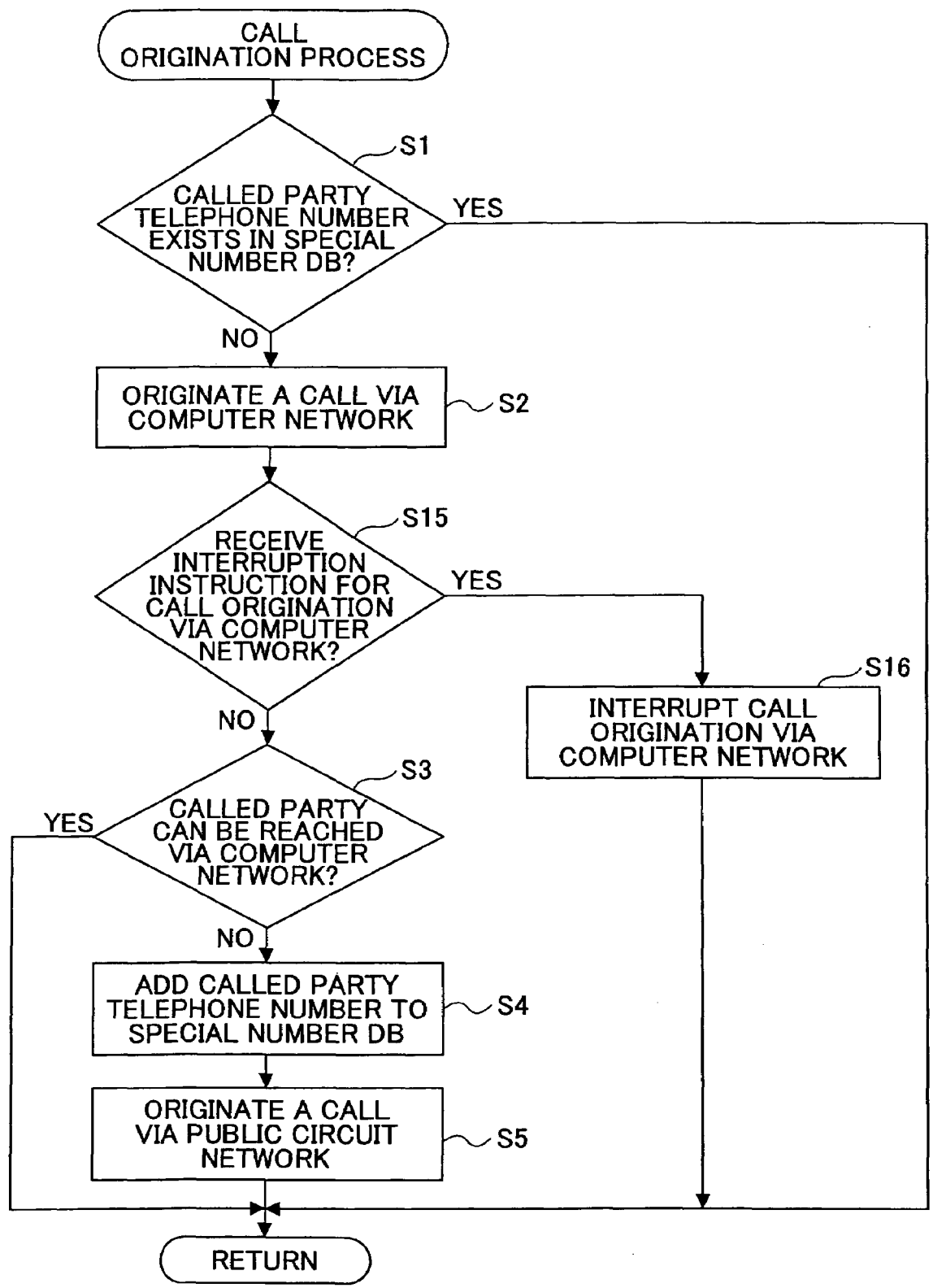
FIG. 11 is a flowchart showing a fifth operation example according to the first embodiment.

Next, a fifth operation example of this embodiment is described with reference to FIG. 11. In FIG. 11, same reference numerals have been used to identify corresponding steps in FIG. 8.

In the fifth operation example, when the circuit control part 11 receives a call origination interrupt request while performing a call origination process via the computer network (Yes, step S15), the call origination process is interrupted in step S16.

The call origination interrupt request may be input by using a special button on an operation panel provided in the IP telephone adapter. In addition, the call origination interrupt request may be provided by dialing a specific number, "*", "#" or a combination of these. Further, the request may be input from a PC via the PC I/F 12.

In a case where the fifth operation example is not used, when a user of the IP telephone adapter originates a call to a called party that does not support IP telephone, even if the user is aware that the call origination is performed via the computer network, the user cannot interrupt the call origination process. Thus, the user may feel impatient, and the operability of the IP telephone adapter may be felt to be bad.

In contrast, according to the fifth operation example, when a user of the IP telephone adapter originates a call to a called party that does not support IP telephone and the user is aware that the call origination is performed via VoIP, the user can interrupt the call origination process. Thus, the operability of the IP telephone adapter can be improved.

Figure 12:
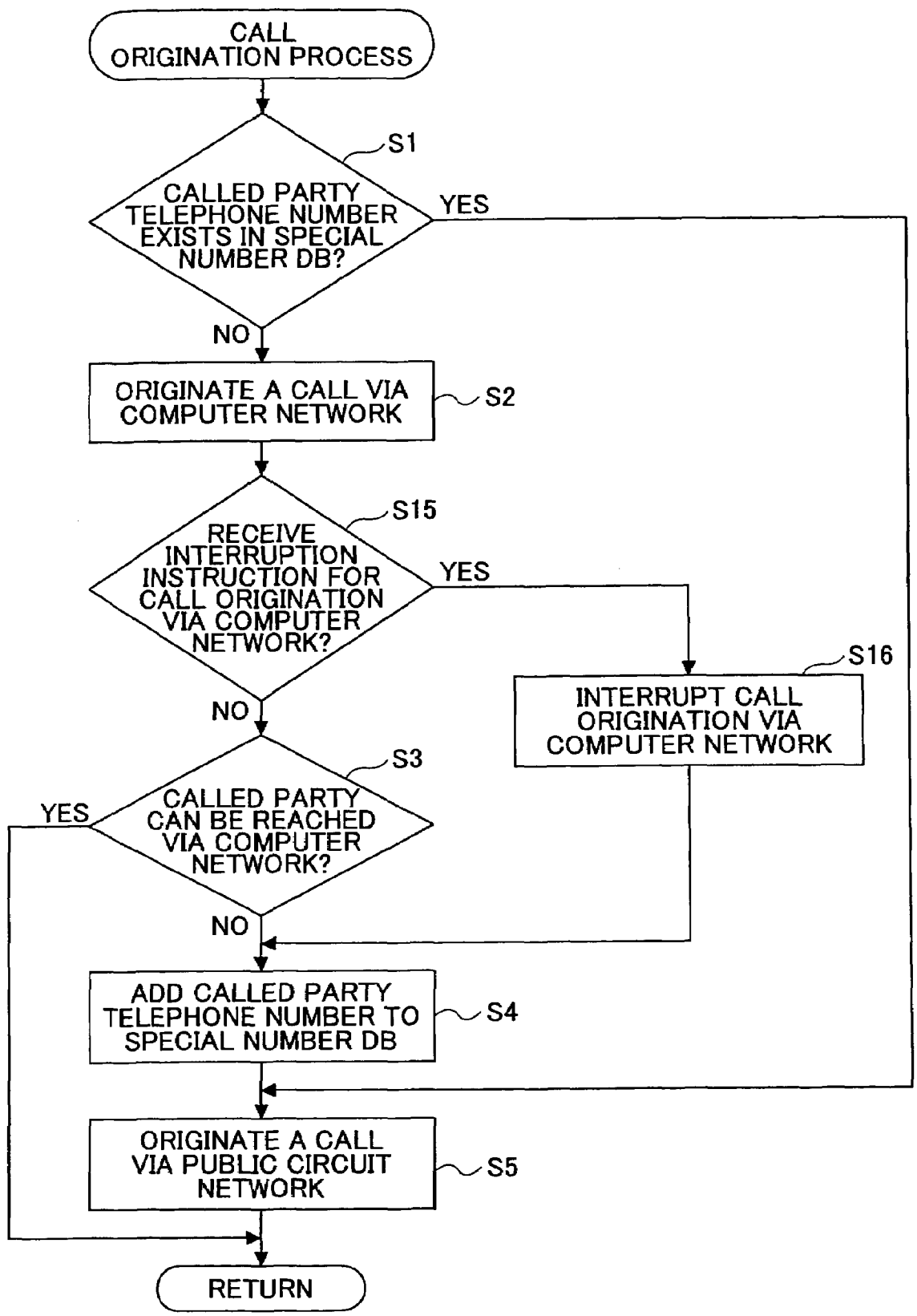
FIG. 12 is a flowchart showing a sixth operation example according to the first embodiment.

Next, a sixth operation example of this embodiment is described with reference to FIG. 12. In FIG. 12, same reference numerals have been used to identify corresponding steps in FIGS. 8-11.

In the sixth operation example, when the circuit control part 11 receives a call origination interrupt request while performing a call origination process via the computer network (Yes, step S15), the call origination process is interrupted in step S16. Then, the telephone number of the called party is added to the special number information database 171 by the special number information changing part 16 (steps S16, S4).

The call origination interrupt request may be input by using a special button on an operation panel provided in the IP telephone adapter. In addition, the call origination interrupt request may be provided by dialing a specific number, "*", "#" or a combination of these. Further, the request may be input from a PC via the PC I/F 12.

In a case where the sixth operation example is not used, it is not possible to reflect, in the special number information database, a fact that that a called party does not support IP telephone without incurring additional operations for the user.

In contrast, according to the sixth operation example, since the telephone number is automatically added to the special number information database when the user instructs to interrupt the call origination process via VoIP, the telephone number can be added to the special number information database without incurring additional operations.

Figure 13:
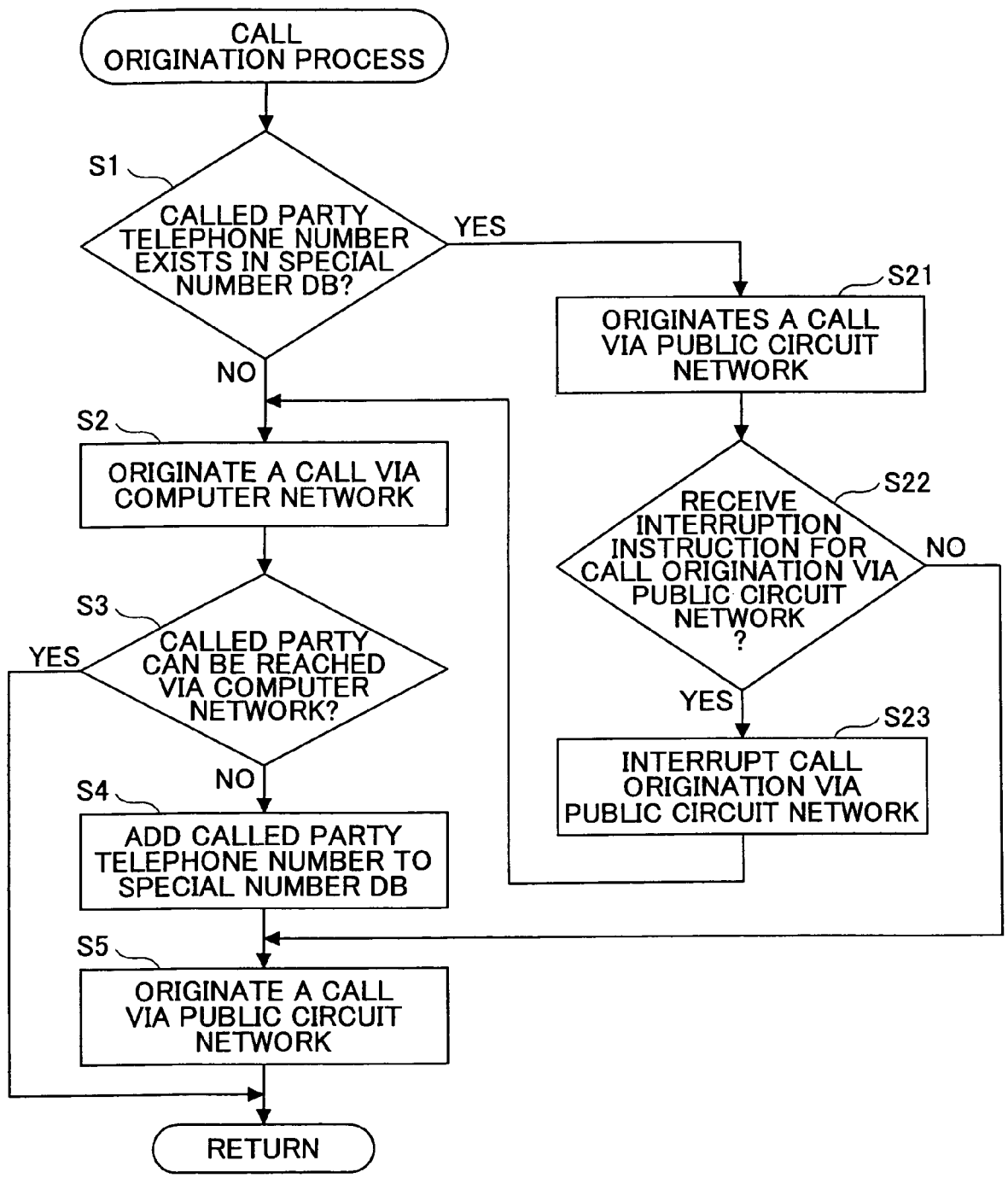
FIG. 13 is a flowchart showing a seventh operation example according to the first embodiment.

Next, a seventh operation example of this embodiment is described with reference to FIG. 13. In FIG. 13, same reference numerals have been used to identify corresponding steps in FIG. 8.

In the seventh operation example, when a call origination interrupt request is input (step S22) while a call origination process is being performed via the public circuit network (step S21), the circuit control part 11 interrupts the call origination process in step S23, and starts to originate a call via the computer network in step S2.

The call origination interrupt request may be input by using a special button on an operation panel provided in the IP telephone adapter. In addition, the call origination interrupt request may be provided by dialing a specific number, "*", "#" or a combination of these. Further, the request may be input from a PC via the PC I/F 12.

In a case where the seventh operation example is not used, when a user of the IP telephone adapter originates a call to a called party that supports IP telephone, even if the user is aware that the call origination is performed via the public circuit network, the user cannot interrupt the call origination process. Thus, the user may loose a chance to use the IP telephone whose communication cost is generally lower than that of the public circuit network.

In contrast, according to the seventh operation example, by performing a predetermined operation while originating a call via the public circuit network, the call origination can be interrupted and a call origination via the computer network can be performed. Thus, the advantage of the IP telephone can be obtained.

Figure 14:
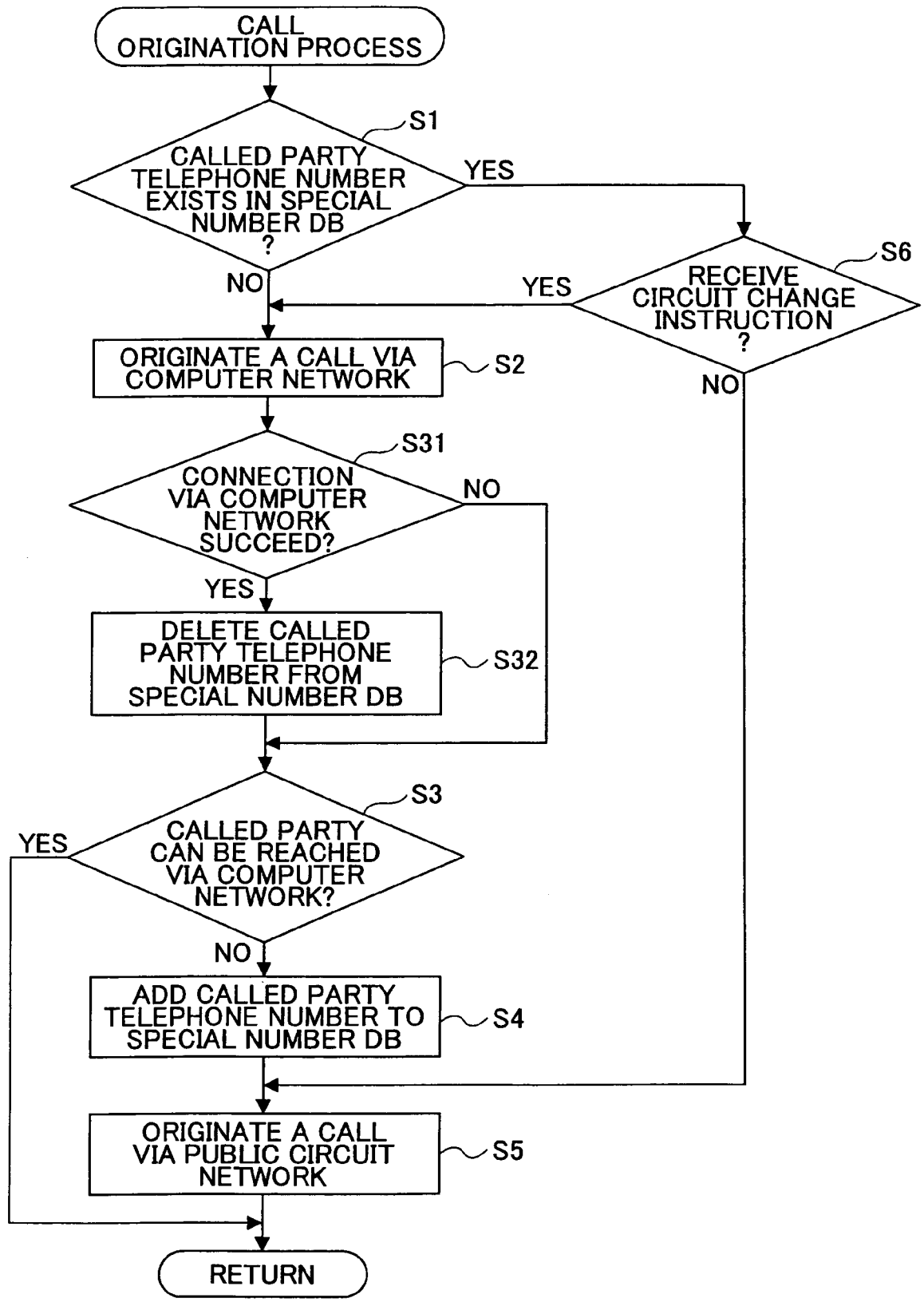
FIG. 14 is a first flowchart showing a eighth operation example according to the first embodiment.

Next, a eighth operation example of this embodiment is described with reference to FIGS. 14 and 15. In FIG. 14, same reference numerals have been used to identify corresponding steps in FIGS. 8-11.

When the use circuit enforcedly determining part 18 determines a telephone number to which a call is to be originated via the computer network (step S6, Yes), a call origination to the telephone number is performed via the computer network in step S2. If the connection to the telephone number is successfully established in step S31, the special number information changing part 16 deletes the telephone number from the special number information database 171 in step S32.

Figure 15:
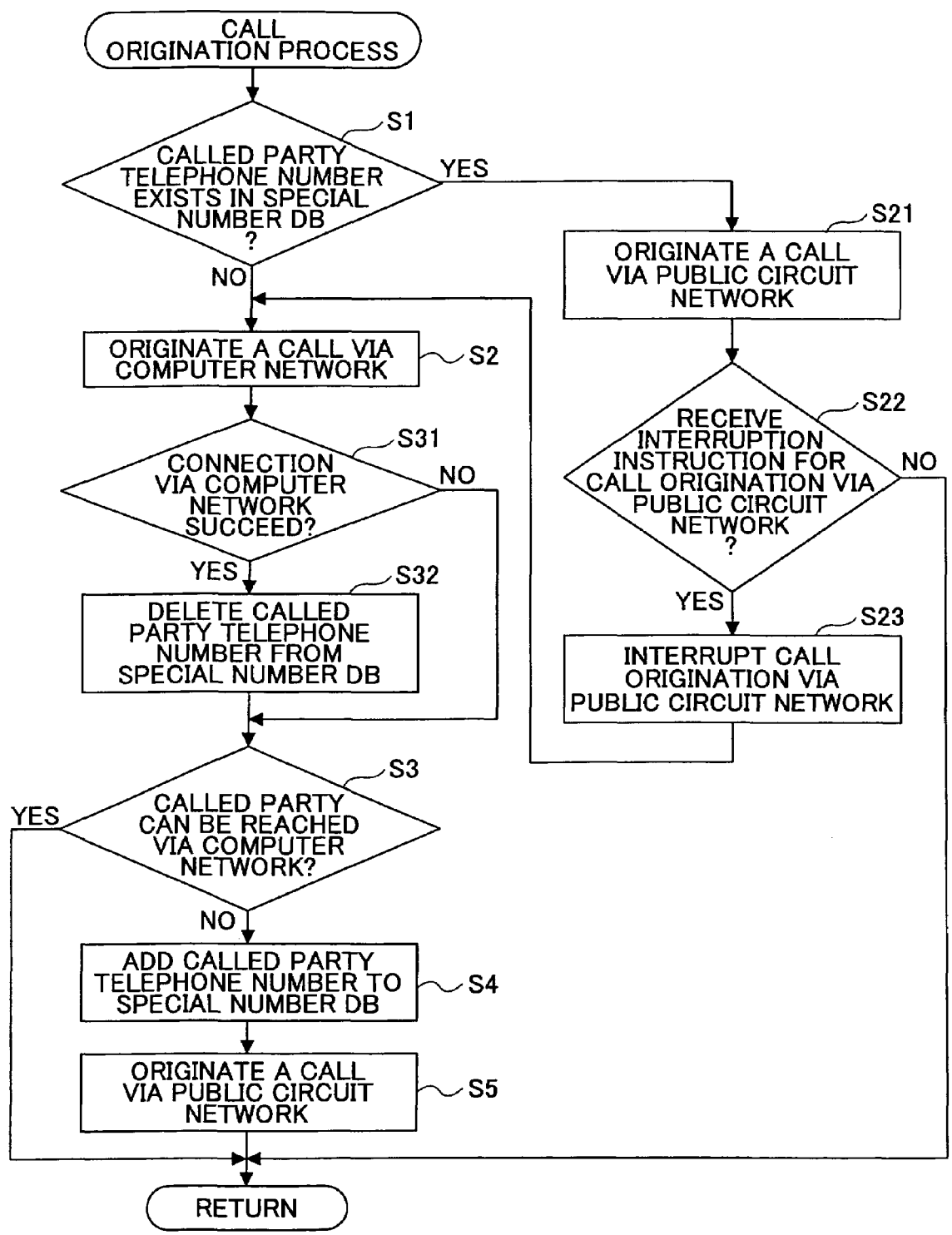
FIG. 15 is a second flowchart showing the eighth operation example according to the first embodiment.

In a case shown in FIG. 15, when a call origination process is performed via the public circuit network in step S21, if a call origination interrupt request is input in step S22, the call origination process is interrupted in step S23. Then, a call origination to the interrupted telephone number is performed via the computer network in step S2. If the connection to the telephone number is successfully established in step S31, the special number information changing part 16 deletes the telephone number from the special number information database 171 in step S32.

The call origination interrupt request may be input by using a special button on an operation panel provided in the IP telephone adapter. In addition, the call origination interrupt request may be provided by dialing a specific number, "*", "#" or a combination of these. Further, the request may be input from a PC via the PC I/F 12.

In a case where the eighth operation example is not used, even if a connection has been once established via VoIP, a call origination may be performed via the public circuit network in a next connection unless the special number information database is updated.

In contrast, according to the eighth operation example, when a connection to a telephone number is successfully established via the computer network, the telephone number is automatically deleted from the special number information database 171. Thus, the special number information database can be updated without incurring additional operations for the user.

In the following, a ninth operation example is described.

In the ninth operation example, when the circuit control part 11 performs a call origination process, the circuit type display part 191 displays a type of a circuit via which the call is originated.

A two-color LED may be used as the circuit type display part 191. For example, the LED illuminates green light if the call origination is being performed via the public circuit network, and the LED illuminates orange light if the call origination is being performed via the computer network.

According to the ninth operation example, since a type of a circuit via which a call is being originated can be displayed, the user can know the operation status of the IP telephone adapter. That is, since the user can know the circuit type, the user can perform an operation according to the circuit type such as enforcedly interrupting call origination.

Next, a tenth operation example in this embodiment is described.

In the tenth operation example, when the circuit control part performs a call origination process, the IP telephone adapter causes the ringing part 192 to output a circuit type specific ringback tone that is assigned to each circuit type. The ringing part 192 may include a buzzer that outputs a sound by itself. Alternatively, the ringing part may cause a handset of the telephone to output the circuit type specific ringback tone via the telephone I/F 13.

As the circuit type specific ringback tone, for example, following two sounds (1) and (2) are provided so that a sound is selected according to a circuit type.

(1) For public circuit network: 400 Hz, 16 Hz modulation, 1 sec:ON—2 sec:OFF Repeat (2) For computer network: 800 Hz, 16 Hz modulation, 1 sec:ON—2 sec:OFF Repeat According to the tenth operation example, since a ringback tone corresponds to a circuit type used for call origination, the user can know the operation status of the VoIP apparatus only by hearing the ringback tone without checking an display panel of the IP telephone adapter.

Next, an eleventh operation example in this embodiment is described.

In the eleventh operation example, the ringing part 192 starts outputting the circuit type specific ringback tone (to be also referred to as "call origination start sound") at a time when the circuit control part 11 starts a call origination process. The circuit type specific ringback tone corresponds to a circuit via which the circuit control part 11 starts the call origination.

As the circuit type specific ringback tone, for example, following two sounds (1) and (2) are provided so that a sound is selected according to a circuit type.

Figure 3:
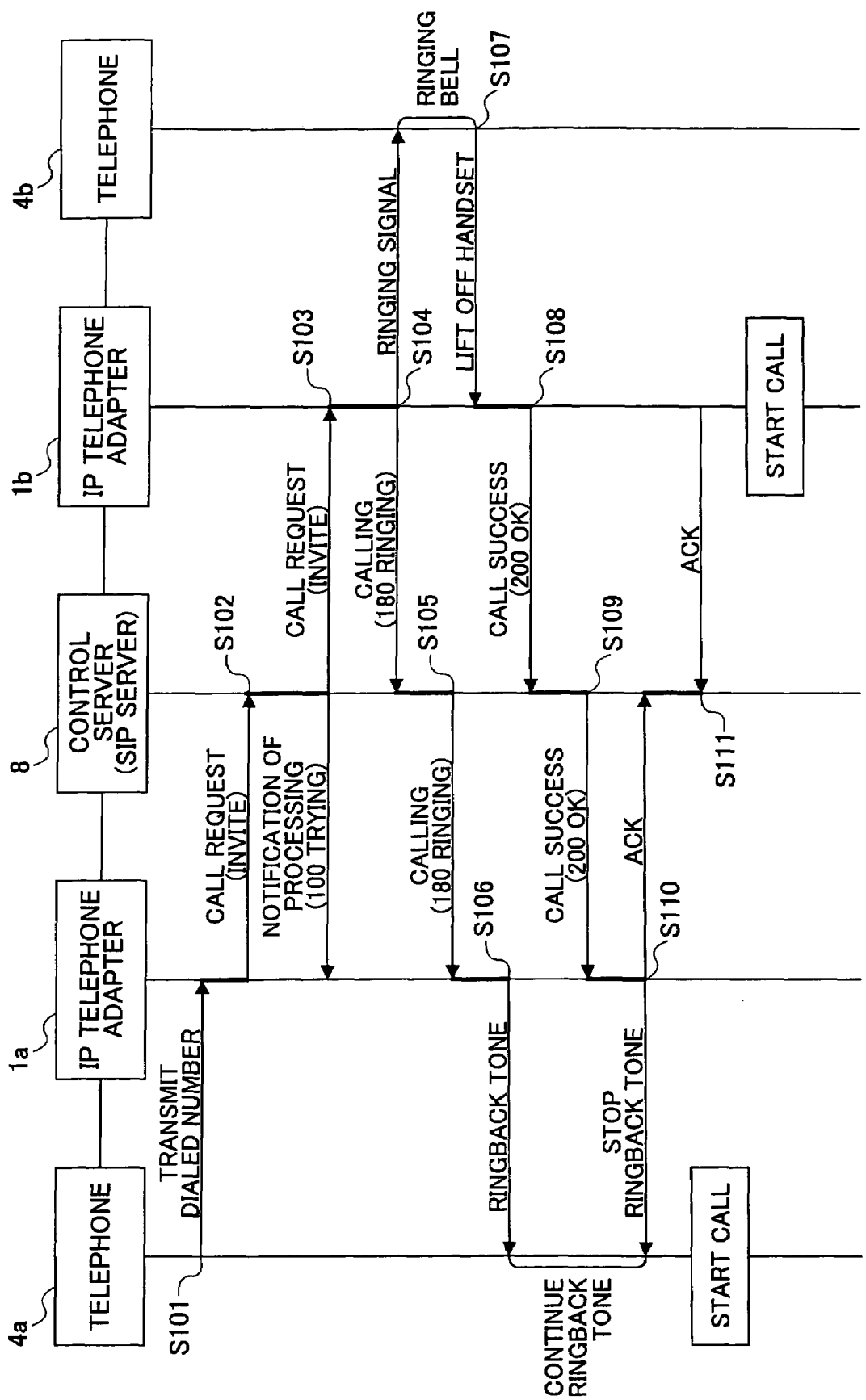
FIG. 3 is a sequence chart showing a procedure for establishing a call connection via an IP telephone network.

(1) For public circuit network: 400 Hz, 125 msec:ON—125 msec:OFF Repeat (2) For computer network: 400 Hz, 60 msec:ON—60 msec:OFF Repeat Generally, a ringback tone starts ringing when the IP telephone adapter receives the 180 Ringing message from the control server 8 (step S106 in FIG. 3). On the other hand, in this example, the call origination start sound starts ringing when the IP telephone adapter sends the call request (INVITE) to the control server 8 (step S102 in FIG. 3). Thus, the user can be notified of the operation status of the VoIP apparatuses quickly.

In a case when a call is originated via the public circuit network, the call origination start sound starts ringing when the circuit control part 11 starts sending a DTMF signal (push phone signal) or a DP signal (dial pulse signal) to the public circuit network.

According to the eleventh operation example, since the ringing part rings the call origination start sound (different from a regular ringback tone) when the call origination via the computer network is started, the user can immediately know a used circuit type when the call origination is started. Thus, for example, the user can immediately instruct switching to the public circuit network as necessary. As a result, a waiting time for establishing a connection to the called party can be decreased, so that operability improves.

In addition, since the ringing part rings the call origination start sound (different from regular ringback tone) when the call origination via the public circuit network is started, the user can immediately know a used circuit type when the call origination is started. Thus, for example, the user can immediately instruct switching to the computer network as necessary. As a result, a waiting time for establishing a connection to the called party can be decreased, so that operability improves.

The IP telephone adapter of the first embodiment may be an integrated type adapter that includes a router, or that is an all-in-one type adapter. The all-in-one type adapter includes a router and an ADSL modem. The configuration of the IP telephone adapter is not limited to the above-mentioned configurations as long as the IP telephone adapter includes functions for connecting to the computer network for realizing IP telephone and for connecting to the public circuit network such as the PSTN. For example, the present invention can be similarly applied to a computer network realized by optical fibers instead of ADSL.

Second Embodiment

In the following, an IP telephone adapter according to a second embodiment of the present invention is described.

In the second embodiment, in addition to the functions described in the first embodiment, the IP telephone adapter includes a function for enabling a user to edit registered information in the rewritable region in the special number information database 171.

In the IP telephone adapter of the second embodiment, the special number information changing part 16 has a function for adding a part or the whole of a telephone number into the special number information database 171 on the basis of an input from the outside of the IP telephone adapter.

As means for inputting the telephone number, the IP telephone adapter may be provided with a display part for displaying registered special numbers on an operation panel, buttons for inputting the number, and a button for specifying add/delete of a special number. Alternatively, the IP telephone adapter may include a Web (http) server function. In this case, when a PC connected via the PC I/F 12 accesses the IP apparatus via a Web browser, a special number editing screen is displayed, and the IP telephone adapter receives data from the PC 5.

A first operation example in the second embodiment is described.

In the first operation example, when the IP telephone adapter receives a telephone number from the outside of the adapter with an instruction to add the number as a special number, the special number information changing part 16 adds the telephone number in the special number information database 171.

In a case where the first operation example is not used, a special number cannot be added to the apparatus or to the IP telephone adapter. When originating a call to a telephone number other than the special number, the IP telephone adapter tries to establish a connection via the computer network first, then, the IP telephone adapter establishes a connection via the public telephone network. Therefore, if the called party is reached only via the public circuit telephone network, the operation to try to establish a connection via the computer network is useless, and the time from starting a call origination process to establishing a connection becomes long.

Against this problem, according to the above-mentioned first operation example, a telephone number of a called party that can be reached only via the public circuit network can be added to the special number information database. Thus, the call origination process via the computer network can be omitted, so that the connection time from starting a call origination process to establishing a connection can be decreased.

According to the first operation example, especially, connection to the telephone 4*d* or the mobile telephone 4*e* can be established without trying to establish a connection via the computer network so that the connection can be established quickly.

A second operation example is described next. In the second operation example, when the number of digits of a telephone number of a called party is larger than that of a number registered in the special number information database, the circuit control part 11 compares the beginning of the telephone number with registered numbers. If there is a match, the circuit control part 11 determines that a connection to a called party of the telephone number can be established via the public circuit network without trying to connect via the computer network.

For example, assuming "090" is registered as a special number, when originating a call to a telephone number having "090" at the beginning, if the circuit control part 11 determines that three digits from the top of the telephone number are the same as "090", a call origination is performed via the public circuit network.

In a case where the second operation example is not used, whole digits of a telephone number should be registered in the database, so that the operability may become bad. Against this problem, according to this operation example, the telephone number to which a connection is established via the public circuit network is determined by comparing beginning digits of the telephone number with numbers in the database. Therefore, for example, if all telephone numbers of a carrier should be connected via the public telephone network, an identifying number of the carrier is only stored in the database instead of storing all of the telephone number. Thus, the operation for registering numbers becomes efficient.

Next, a third operation example is described. In the third operation example, the special number information changing part 16 edits, according to an input from the outside of the adapter, a telephone number of a part of a telephone number that is added to the special number information database.

An editing screen for the special number may indicate only added special numbers as objects for delete. Alternatively, if deletion is instructed for a special number that is initially registered in the database, an error message may be displayed so that deletion of the special number is avoided.

In a case where the third operation example is not used, a special number registered beforehand may be erroneously deleted. In such a case, there is a danger that a telephone call cannot be made to the police (110) or to the fire department (119) in an emergency.

Against this problem, according to the third operation example, only a special number that is added can be edited, the above-mentioned problem can be prevented.

Next, a fourth operation example is described. In the fourth operation example, after a connection to a called party is established, the special number information changing part 16 adds or deletes the telephone number of the called party according to an input from the outside of the apparatus.

The add/delete instruction may be input by using a special button on an operation panel provided in the IP telephone adapter. In addition, the instruction may be provided by dialing a specific number, "*", "#" or a combination of these. Further, the instruction may be input from a PC via the PC I/F 12.

In a case where the fourth operation example is not used, when a user wants to add or delete a number, the user needs to input the whole number, so that the operability is not good.

Against this problem, according to the fourth operation example, by performing a predetermined operation after a connection is established, the telephone number of the called party can be added or deleted, so that maintenance activities of the special number information database become very efficient.

Although the function for editing the rewritable region in the special number information database 171 in the second embodiment has been described as a function added to the function in the first embodiment, the function in the second embodiment may be provided as a replacement for the function in the first embodiment in which a telephone number that is not connectable via the computer network is automatically added to the special number information database 171.

Third Embodiment

Next, a third embodiment of the present invention is described. In the third embodiment, a multi-function (MF) machine is used as the telephone adapter of the first and second embodiments.

As shown in FIG. 16, the MF machine of this embodiment includes a telephone send/receive part 41, an image reading part 42 and an image forming part 43 instead of the telephone I/F 13 of the IP telephone adapter in the first and second embodiments.

The telephone send/receive part 41 realizes known functions of a telephone. In addition, each of the image reading part 42 and the image forming part 43 realizes known functions.

Operations for receiving and sending data or signals for performing communications are the same as operations performed by the IP telephone adapter and the telephone in the previous embodiments.

Also as to an FAX communication, like the first and second embodiments, the MF machine can perform the FAX communication via the IP telephone network.

The present invention can be also applied to a MF machine such as an internet facsimile supporting T.38, and an internet telephone including the circuit control part in the same way as the IP telephone adapter.

In addition, for example, the configuration of the machine is not limited to the above-mentioned configurations as long as the machine includes functions for connecting to the computer network for realizing IP telephone and for connecting to the public circuit network such as the PSTN. For example, the present invention can be similarly applied to a computer network realized by optical fibers instead of ADSL.

The present invention is not limited to the specifically disclosed embodiments, and variations and modifications may be made without departing from the scope of the present invention.

The present application contains subject matter related to Japanese patent application No.2003-408245, filed in the JPO on Dec. 5, 2003, the entire contents of which are incorporated herein by reference.

What is claimed is:

1. A circuit control apparatus for establishing a connection to a communication partner via a public circuit network or via a computer network, the circuit control apparatus comprising:

a specifying information storing part configured to store specifying information for specifying called parties to which the circuit control apparatus originates a call to establish a connection via the public circuit network;

a checking part configured to check whether a telephone number of a called party exists in the specifying information storing part;

a circuit control part configured to originated said call for establishing a connection to the called party; and a changing part configured to change specifying information in the specifying information storing part, wherein when the checking part determines that the telephone number of the called party exists in the specifying information storing part, the circuit control part originates said call to the called party via the public circuit network in order to connect to the called party, and originates another call to the called party via the computer network in the background in order to determine if a connection to the called party can be established via the computer network, and the circuit control part causes the changing part to delete the telephone number from the specifying information storing part if a connection to the called party can be established via the computer network, and when the checking part determines that the telephone number of the called party does not exist in the specifying information storing part, the circuit control part originates a call via the computer network to the called party, and when the circuit control part determines that the circuit control apparatus cannot connect to the called party via the computer network, the changing part adds the telephone number of the called party to the specifying information storing part, then, the circuit control part originates a call to the called party via the public circuit network.

2. The circuit control apparatus as claimed in claim 1, wherein the changing part deletes the specific telephone number from the specifying information storing part when a predetermined effective term elapses after the specific telephone number is added to the specifying information storing part.

3. The circuit control apparatus as claimed in claim 1, wherein the changing part adds a telephone number or a part of a telephone number to the specifying information storing part as the identifying information on the basis of an input from the outside of the circuit control apparatus.

4. The circuit control apparatus as claimed in claim 3, wherein, when a number of digits of a telephone number of a called party is larger than that of a number registered in the specifying information storing part, the circuit control part compares top digits of the telephone number with the registered number, and the circuit control part originates a call to the telephone number via the public circuit network if the top digits and the registered number are the same.

5. The circuit control apparatus as claimed in claim 1, wherein, after a connection to a called party is established, the changing part adds a telephone number of the called party to the specifying information storing part or the changing part deletes the telephone number of the called party from the specifying information storing part.

6. The circuit control apparatus as claimed in claim 1, wherein the changing part edits, according to an input from the outside of the circuit control apparatus, only specifying information that is added to the specifying information storing part.

7. The circuit control apparatus as claimed in claim 1, the circuit control apparatus further comprising:
a use circuit enforcedly determining part configured to cause the circuit control apparatus to try to establish a connection to a called party via the computer network regardless of whether the called party is included in the specifying information storing part when receiving an instruction to use the computer network from outside of the circuit control apparatus.

8. The circuit control apparatus as claimed in claim 1, wherein, when a call origination interrupt request is received while performing a call origination process to establish a connection to a specific telephone number via the computer network, the circuit control part interrupts the call origination process.

9. The circuit control apparatus as claimed in claim 8, wherein the changing part adds the specific telephone number into the specifying information storing part.

10. The circuit control apparatus as claimed in claim 1, wherein, when a call origination interrupt request is received while performing a call origination process to establish a connection to a specific telephone number via the public circuit network, the circuit control part interrupts the call origination process and performs a call origination process via the computer network to the specific telephone number.

11. The circuit control apparatus as claimed in claim 7, wherein, if the circuit control apparatus successfully establishes the connection to the called party via the computer network, the changing part deletes a telephone number of the called party from the specifying information storing part.

12. The circuit control apparatus as claimed in claim 10, wherein, if the circuit control apparatus successfully establishes the connection to the specific telephone number via the computer network, the changing part deletes the specific telephone number from the specifying information storing part.

13. The circuit control apparatus as claimed in claim 1, the circuit control apparatus further comprising:
a circuit type display part configured to display a type of a circuit via which the circuit control apparatus is originating a call.

14. The circuit control apparatus as claimed in claim 1, the circuit control apparatus further comprising:
a ringing part configured to output a circuit type specific ringback tone that is assigned to each type of a circuit used for originating a call,
wherein, when starting originating a call via an originating circuit, the circuit control part causes the ringing part to output the circuit type specific ringback tone that corresponds to a type of the originating circuit.

15. A circuit control method for use in a circuit control apparatus for establishing a connection to a communication partner via a public circuit network or via a computer network, wherein the circuit control apparatus includes a specifying information storing part for storing specifying information for specifying called parties to which the circuit control apparatus originates a call to establish a connection via the public circuit network, the circuit control method comprising:
checking whether a telephone number of a called party exists in the specifying information part;
circuit controlling immediately originating said call for establishing a connection to the called party; and
changing specifying information in the specifying information storing part, wherein
when the checking determines that the determines that the telephone number of the called party exists in the specifying information storing part. the circuit controlling originates said call to the called party via the public circuit network in order to connect to the called party, and originates another call to the called party via the computer network in the background in order to determine if a connection to the called party can be established via the computer network, and the circuit controlling causes the changing to delete the telephone number from the specifying information storing part if a connection to the called party can be established via the computer network, and
when the checking determines that the telephone number of the called party does not exist in the specifying information storing part, the circuit controlling originates a call via the computer network to the called party, and when the circuit controlling determines that the circuit control apparatus cannot connect to the called party via the computer network, the changing adds the telephone number of the called party to the specifying information storing part, then, the circuit controlling originates a call to the called party via the public circuit network.

16. The circuit control method as claimed in claim 15, wherein the specific telephone number is deleted from the specifying information storing part when a predetermined effective term elapses after the specific telephone number is added to the specifying information storing part.

17. The circuit control method as claimed in claim 15, wherein a telephone number or a part of a telephone number is added to the specifying information storing part as the identifying information on the basis of an input from the outside of the circuit control apparatus.

18. The circuit control method as claimed in claim 17, wherein, when a number of digits of a telephone number of a called party is larger than that of a number registered in the specifying information storing part, the circuit control apparatus compares top digits of the telephone number with the registered number, and the circuit control apparatus originates a call to the telephone number via the public circuit network if the top digits and the registered number are the same.

19. The circuit control method as claimed in claim 15, wherein, after a connection to a called party is established, the circuit control apparatus adds a telephone number of the called party to the specifying information storing part or deletes the telephone number of the called party from the specifying information storing part.

20. The circuit control method as claimed in claim 15, wherein the circuit control apparatus edits, according to an input from the outside of the circuit control apparatus, only specifying information that is added to the specifying information storing part.

21. The circuit control method as claimed in claim 15, wherein the circuit control apparatus tries to establish a connection to a called party via the computer network regardless of whether the called party is included in the specifying information storing part when the circuit control apparatus receives an instruction to use the computer network for originating a call from outside of the circuit control apparatus.

22. The circuit control method as claimed in claim 15, wherein, when a call origination interrupt request is received while performing a call origination process to establish a connection to a specific telephone number via the computer network, the circuit control apparatus interrupts the call origination process.

23. The circuit control method as claimed in claim 22, wherein the circuit control apparatus adds the specific telephone number into the specifying information storing part.

24. The circuit control method as claimed in claim 15, wherein, when a call origination interrupt request is received while performing a call origination process to establish a connection to a specific telephone number via the public circuit network, the circuit control apparatus interrupts the call origination process and performs a call origination process via the computer network to the specific telephone number.

25. The circuit control method as claimed in claim 21, wherein, if the circuit control apparatus successfully establishes the connection to the called party via the computer network, the circuit control apparatus deletes a telephone number of the called party from the specifying information storing part.

26. The circuit control method as claimed in claim 24, wherein, if the circuit control apparatus successfully establishes the connection to the specific telephone number via the computer network, the circuit control apparatus deletes the specific telephone number from the specifying information storing part.

27. The circuit control method as claimed in claim 15, wherein the circuit control apparatus displays a type of a circuit via which the circuit control apparatus is originating a call.

28. The circuit control method as claimed in claim 15, wherein, when the circuit control apparatus starts originating a call via an originating circuit, the circuit control apparatus starts outputting a circuit type specific ringback tone that corresponds to a type of the originating circuit.

* * * * *